United States Patent
Peet

(10) Patent No.: US 6,410,124 B1
(45) Date of Patent: Jun. 25, 2002

(54) FILMS WITH IMPROVED METALLIZABLE SURFACES

(75) Inventor: Robert G. Peet, Pittsford, NY (US)

(73) Assignee: ExxonMobil Oil Corporation, Fairfax, VA (US)

(*) Notice: Subject to any disclaimer, the term of this patent is extended or adjusted under 35 U.S.C. 154(b) by 0 days.

(21) Appl. No.: 09/281,387

(22) Filed: Mar. 30, 1999

(51) Int. Cl.[7] .............................................. B32B 27/32
(52) U.S. Cl. ...................... 428/215; 428/349; 428/461; 428/515; 428/516; 264/173.14; 264/173.15; 264/173.19
(58) Field of Search ...................... 264/173.11, 173.14, 264/173.15, 173.19; 428/910, 515, 516, 220, 213, 215, 461, 349

(56) References Cited

U.S. PATENT DOCUMENTS

| | | | |
|---|---|---|---|
| 4,377,616 A | 3/1983 | Ashcraft et al. | 428/213 |
| 4,794,096 A | 12/1988 | Ewen | 502/117 |
| 4,892,851 A | 1/1990 | Ewen et al. | 502/104 |
| 4,975,403 A | 12/1990 | Ewen | 502/113 |
| 5,036,034 A | 7/1991 | Ewen | 502/117 |
| 5,055,438 A | 10/1991 | Canich | 502/117 |
| 5,057,475 A | 10/1991 | Canich et al. | 502/104 |
| 5,153,157 A | 10/1992 | Hlatky et al. | 502/117 |
| 5,155,080 A | 10/1992 | Elder et al. | 502/152 |
| 5,158,920 A | 10/1992 | Razavi | 502/152 |
| 5,162,278 A | 11/1992 | Razavi | 502/152 |
| 5,192,620 A | 3/1993 | Chu et al. | 428/461 |
| 5,194,318 A | 3/1993 | Migliorini et al. | 428/215 |
| 5,198,401 A | 3/1993 | Turner et al. | 502/155 |
| 5,252,384 A | 10/1993 | Bothe et al. | 428/212 |
| 5,254,394 A | 10/1993 | Bothe et al. | 428/212 |
| 5,278,119 A | 1/1994 | Turner et al. | 502/155 |
| 5,529,843 A | 6/1996 | Dries et al. | 428/336 |
| 5,605,660 A | 2/1997 | Buongiorno et al. | 264/456 |
| 5,620,803 A | 4/1997 | Oyama et al. | 428/516 |
| 5,695,840 A | 12/1997 | Mueller | 428/35.7 |
| 5,731,254 A | * 3/1998 | Winter et al. | 502/117 |
| 5,792,549 A | 8/1998 | Wilkie | 428/215 |
| 6,106,933 A | * 8/2000 | Nagai et al. | 428/212 |

FOREIGN PATENT DOCUMENTS

| | | |
|---|---|---|
| EP | 0 484817 A1 | 10/1991 |
| JP | 10-329262 | * 12/1998 |

OTHER PUBLICATIONS

Database WPI, Section ch, Week 199616, Derwent Publications, Ltd., XP002146498 & JP 08 039743 A, Feb. 13, 1996.

Database WPI, Section ch, Week 199750, Derwent Publications, Ltd., XP002146499 & JP 09 262270 A, Oct. 7, 1997.

Database WPI, Section ch, Week 199604, Derwent Publications, Ltd., XP002146500 & JP 07 304141 A, Nov. 21, 1995.

Database WPI, Section ch, Week 199549, Derwent Publications, Ltd., XP002146501 & JP 07 256841 A, Oct. 9, 1995.

* cited by examiner

Primary Examiner—Paul Thibodeau
(74) Attorney, Agent, or Firm—Dennis P. Santini; Rick F. James

(57) ABSTRACT

A multi-layer film includes a base layer comprising a polyolefin and at least one additional layer comprising a metallocene-catalyzed syndiotactic polypropylene, wherein the base layer and the at least one additional layer comprising a metallocene-catalyzed syndiotactic polypropylene are not suitable for use as a heat sealable film. The multi-layer films of the present invention have improved metallizable surfaces and the metallized films exhibit excellent gas (e.g., oxygen and water vapor) barrier properties, as well as good pick off, optical properties (optical density, haze, and gloss), and coefficient of friction (COF).

12 Claims, No Drawings

FILMS WITH IMPROVED METALLIZABLE SURFACES

FIELD OF THE INVENTION

The present invention relates to films with improved metallizable surfaces. More particularly, the present invention relates to a polymeric film with improved metallizable surfaces, wherein the film, particularly after metallization, possesses a superior balance of oxygen and water vapor barrier characteristics as well as optical properties.

BACKGROUND OF THE INVENTION

Polymeric films have been widely used for packaging various food and non-food products. In order to ensure proper preservation of products packaged in such polymeric films, it is necessary to provide films with barriers against the transmission of air, moisture, deleterious flavors, and the like. Also, in the packaging of various products, it is important to provide films having good optical properties. Conventional polymeric films, however, typically lack the balance of excellent gas barrier characteristics and good optical properties required for packaging films. For example, polypropylene films are particularly preferred in the manufacture of packaging films as a result of their low cost and ease of manufacture. Such films, however, inherently permit the transmission of oxygen and water vapor from the outside to the inside of the package. As will be recognized by those skilled in the art, transmission of oxygen and water vapor through food packaging promote deterioration of the foods packaged therein.

Multi-layer polymeric films having improved gas and moisture barrier characteristics have been developed. For example, it is known that films incorporating ethylene-vinyl alcohol copolymer as a coextruded or coated layer thereon exhibit improved oxygen and moisture barrier properties. U.S. Pat. No. 5,192,620 discloses an oriented polypropylene base layer having a coating on one surface of a blend of vinyl alcohol homopolymer or copolymer and an ethylene-acrylic acid copolymer, with a further metal layer thereon. Films incorporating ethylene-vinyl alcohol as coextruded or coated layers, however, are difficult and expensive to manufacture.

U.S. Pat. No. 5,194,318 discloses a metallized oriented thermoplastic film structure having a propylene homopolymer or copolymer substrate with a high density polyethylene skin layer on at least one side of the substrate. The high density polyethylene skin layer is further provided with a thin metal layer which has been vapor deposited thereon. In one embodiment, the high density polyethylene skin layer is treated with flame or corona discharge, and the metal coating is thereafter deposited onto the flame or corona discharge treated layer. Although films which incorporate a high density polyethylene skin do not suffer from the deleterious effects of metal pick off, such films do not provide optimum oxygen and water vapor barrier properties.

U.S. Pat. No. 5,254,394 discloses a heat-sealable multi-layer film which comprises: (a) a base layer comprising isotactic polypropylene; and (b) at least one additional layer comprising syndiotactic polypropylene. According to the patent, the film has, inter alia, both good heat sealing and optical properties.

While the prior art discloses various packaging films, many conventional films do not provide a surface which is desirable for metallization and do not possess balanced optical properties and oxygen and water vapor barrier characteristics. Some films provide heat sealing skin layers that are not adequate for metallizing. Thus, there is a need in the art for films fulfilling the requirement of improved surface for metallizing.

SUMMARY OF THE INVENTION

It is an object of the present invention to provide a film with improved metallizable surfaces.

It is also an object of the present invention to provide a film having excellent oxygen and water vapor barrier properties as well as good optical properties.

These and other objects of the present invention are achieved by providing a multi-layer film comprising:
(a) a base layer comprising a polyolefin; and
(b) at least one additional layer comprising a metallocene-catalyzed syndiotactic polypropylene, wherein the base layer and the at least one additional layer comprising a metallocene-catalyzed syndiotactic polypropylene have slow crystallization rates and are not suitable for use as a heat sealable film, unless an additional heat sealable layer is provided as an unrelated optional layer.

DETAILED DESCRIPTION OF THE PREFERRED EMBODIMENTS

The present invention relates to a multi-layer film including (a) a base layer comprising a polyolefin and (b) at least one additional layer comprising a metallocene-catalyzed syndiotactic polypropylene, wherein the base layer and the at least one additional layer comprising a metallocene-catalyzed syndiotactic polypropylene are not suitable for use, without unrelated optional layers, as a heat sealable film.

By the phrase "metallocene-catalyzed syndiotactic polypropylene," it is meant that the syndiotactic polypropylene possesses a molecular structure that corresponds or substantially corresponds to a syndiotactic polypropylene obtained by using an appropriate metallocene catalyst in the polymerization of propylene. By the phrase "not suitable for use as a heat sealable film," it is meant that the layer does not exhibit substantial heat sealability and/or hot tack in the temperature range of about 100 to about 130° C. Specifically, films may or may not exhibit a heat seal by standard tests at 100° C., with most values at 0 g/inch seal strength but, in all cases, hot tack measurements will be less than the minimum level accepted as a standard for use, i.e. 150 g/inch, at all heat sealing temperatures below 115° C. The multi-layer films of the present invention have improved metallizable surfaces and exhibit excellent gas (e.g., oxygen and water vapor) barrier properties, as well as good pick off, and optical properties (haze and gloss), when metallized.

The syndiotactic polypropylene polymers used to produce an excellent surface for metallizing have a very slow crystallization rate. This rate is so slow as to produce unacceptable hot tack and to give the polymers unacceptable sealing characteristics for heat sealable film applications. These polymers have different characteristics from the characteristics inherent in films with good heat sealability.

The polyolefin of the base layer contemplated for the present invention may be any suitable polyolefin useful in the manufacture of thermoplastic polymeric films. Preferably, the polyolefin of the base layer is a propylene homopolymer or copolymer. Propylene homopolymers of particular use include isotactic polypropylene, preferably 80–100% isotactic polypropylene, most preferably about 95% isotactic polypropylene. The propylene homopolymers preferably have a melt flow (measured in accordance with the standard ASTM D1238 method) ranging from about 1.2 to about 10 g/10 minutes, most preferably from about 2.5 to about 6 g/10 minutes. Particularly preferred propylene copolymers include 99.8–93/0.2–7 wt % propylene/ethylene copolymers and other copolymers.

Another desirable polymer suitable for the base layer of the film of this invention is a high density polyethylene (HDPE), which is a substantially linear polymer having a density, e.g., of 0.952 to 0.962 g/cc, a melting point of, e.g., 120 to 148° C. and a substantial degree of crystallinity.

If it is desired to produce a film which is opaque after being subjected to uniaxial or biaxial orientation, microspheres, incompatible polymers, and/or other adjunctives known in the art may optionally be dispersed in the base layer before extrusion and orientation of the film. Such adjunctives are typically material with a higher melting point than and immiscible with the polymer of the base layer and would include any of the polymers disclosed in, e.g., U.S. Pat. Nos. 4,377,616 and 4,632,869. The adjunctives may comprise a polymer, e.g., a polyester such as polybutylene terephthalate (PBT) or polyethylene terephthalate (PET), a nylon, an acrylic resin, polystyrene, or an inorganic material, such as synthetic or naturally-occurring compounds and minerals, or other materials such as glass, metal, or ceramic. The preferred material for the adjunctives is PBT. The particle size of the adjunctives as determined in the opaque film may be, e.g., 0.1 to 10 microns, preferably 0.75 to 2 microns. The adjunctives may be present in the base layer in an amount up to about 20 wt %, preferably 3 to 12 wt % based on the total weight of the base layer. To preserve the structural integrity of the adjunctive-containing base layer, a layer of the unmodified base layer material may be coextruded on one or both sides of the adjunctive-containing base layer. In this case, the total of the adjunctive-containing base layer and the non-adjunctive-containing layer(s) may be considered the overall base layer. When such a structure is subjected to uniaxial or biaxial orientation, the oriented film develops an opaque appearance.

As discussed above, the metallocene-catalyzed syndiotactic polypropylene of the present invention includes syndiotactic polypropylene produced by polymerizing propylene in the presence of a metallocene catalyst. These metallocene-catalyzed syndiotactic polypropylene products are commercially available, but may be produced according to known methods. Such methods are described in, e.g., U.S. Pat. Nos. 5,162,278; 5,158,920; 5,155,080; 5,036,034; 4,975,403; 4,892,851; 4,794,096; 5,055,438; 5,153,157; 5,057,475; 5,198,401; 5,278,119; and in *Organometallics*, 13(3), pp. 954–96, which are incorporated by reference herein.

The metallocene-catalyzed syndiotactic polypropylene preferably has a melt flow (ASTM D1238) of about 1 to about 15 g/10 minutes, preferably about 2 to about 9/10 minutes, most preferably about 4 to about 7 g/10 minutes. Additionally, the metallocene-catalyzed syndiotactic polypropylene of the present invention has a syndiotacticity of about 70–90% based on racemic pentads and 80–98% based on racemic dyads (measured according to $^{13}C$ NMR spectroscopy), preferably 75–85% based on racemic pentads.

Although the present invention contemplates a multi-layer film containing any layer comprising a metallocene-catalyzed syndiotactic polypropylene, the layer comprising the metallocene-catalyzed syndiotactic polypropylene preferably constitutes the skin layer of the multi-layer film. For example, the multi-layer may be in the form of a three-layer structure of a base layer comprising isotactic polypropylene, a skin layer comprising a metallocene-catalyzed syndiotactic polypropylene, and an opposite skin layer comprising the same or different polymer. The multi-layer film of the present invention may comprise more than three layers, e.g., four, five, six, seven, or more layers.

The metallocene-catalyzed syndiotactic polypropylene of the present invention may be in the form of a bulk layer coated on the base layer or some other layer, or coextruded with the base layer or some other layer.

The multi-layer film of the present invention may further include a metal layer deposited on the outer layer. Such deposited metal layers are well known in the art, and can be deposited using any known method, for instance, vacuum deposition, electroplating, sputtering, etc. Preferably, the metal layer is one of vacuum-deposited aluminum, copper, silver, chromium, gold, and mixtures thereof, with aluminum being most preferred.

Optionally, a heat sealable polymer layer can be incorporated into the multi-layer film. .Such a heat sealable polymer layer can be any coating or layer which will permit the film to be heat sealed to itself or to some other surface. Preferably, the multi-layer film includes a polypropylene base layer, a metallocene-catalyzed syndiotactic polypropylene on one side thereof, and a heat sealable layer on the other side thereof. The preferred polymers which may be used to form the heat sealable layer include ethylene polymers, e.g., ethylene-propylene copolymer or an ethylene-propylene-butene-1 terpolymer. The weight ratio of ethylene to propylene to butene-1 may preferably be from about 0–15% ethylene, 50–99% propylene, and 0–35% butene-1, with an ethylene-propylene copolymer containing from about 2–7% by weight ethylene and from about 93% to about 98% by weight propylene and an ethylene-propylene-butene-1 terpolymer containing from about 1–5% by weight ethylene, from about 1–35% by weight butene-1, and from about 60–98% by weight propylene being particularly preferred.

Additionally, a printable surface layer may be used. For example, the multi-layer film can include a polypropylene base layer with a metallocene-catalyzed syndiotactic polypropylene on one side thereof, and a printable surface layer on the other side thereof. The printable surface layer may be selected from any polymer capable of receiving a printed image thereon, such as a polyolefin homopolymer, copolymer or terpolymer, polycarbonate, polyester, high density polyethylene, and so forth.

Further, a polymeric film may be deposited on a metal layer of the multi-layer film. Such a polymeric film can improve the gauge, stiffness, and puncture resistance of the overall film, and can further enhance the barrier properties of the film. The polymeric film may be oriented, unoriented, transparent or opaque. Preferably, the polymeric film is polypropylene or polyethylene, most preferably oriented polypropylene (OPP). This additional polymeric film can be laminated to the metal layer of the multi-layer film using any suitable adhesive, such as a hot melt low density polyethylene.

The multi-layer films of the present invention generally have a total thickness of about 0.4 mil to about 2.5 mils. The metallocene-catalyzed syndiotactic polypropylene may preferably have a thickness of about 0.02 mil to about 0.4 mil.

The metallized multi-layer films of the present invention exhibit excellent barrier properties against oxygen and water vapor transmission. For example, the oxygen transmission rate of the multi-layer film of the present invention may be less than 5 cc/100 in$^2$/24 hours, while the water vapor transmission rate may be less than 0.06 g/100 in$^2$/24 hours. Also, the multi-layer films of the present invention can, e.g., have the following typical properties:

| | |
|---|---|
| Metal Pickoff (as measured by the standard Mobil test) | 10% |
| Optical Density (as measured by the standard Mobil test) | 2.9 |
| Haze (% light transmitted as measured by ASTM D1003) | 1.2% |
| Gloss (% light reflected at 45° as measured by ASTM D2457) | 88.7% |
| COF (I/O) (as measured by ASTM D1894) | 0.65 |
| COF (O/O) (as measured by ASTM D1894) | 0.75 |

The present invention also relates to a method of producing the above-described multi-layer film with improved metallizable surfaces, wherein the film possesses a superior balance of oxygen and water vapor barrier characteristics as well as optical properties. The method comprises:
(a) providing a base layer comprising a polyolefin;
(b) providing at least one additional layer comprising a metallocene-catalyzed syndiotactic polypropylene;
(c) forming a multi-layer film comprising the base layer of (a) and the additional layer of (b); and
(d) optionally orienting the multi-layer film in the machine and/or transverse direction(s).

The film is usually prepared by coextruding the polymers of the above-described layers. After such extrusion of the basic film substrate using conventional extrusion techniques, the film is heated and molecularly oriented in the longitudinal, i.e., machine direction and optionally in the transverse direction. This uniaxial or biaxial orientation, which greatly improves the stiffness and tensile strength properties of the film, is accomplished by using conventional techniques to sequentially or simultaneously stretch the film, e.g., 3 to 8 times in the machine direction and optionally 5 to 12 times in the transverse direction, at a drawing temperature of about 115° C. to about 185° C. In most cases, a coextruded film having a base layer of polypropylene homopolymer would be biaxially oriented.

For some purposes, it may be desirable to produce the polymer substrate comprising the base (core) layer and one or two adjacent skin layers by a cast film or chill roll extrusion process rather than a coextrusion and orientation process. In this case, the final polymer substrate is essentially unoriented and the final metallized film is generally much less stiff than films in which the substrate is prepared by a coextrusion and orientation process.

Before applying a metal or other layer, the surface intended to receive the metal or other layer may be treated to ensure that the coatings will be strongly adhered to the film, thereby eliminating the possibility of the coatings peeling or being stripped from the film. This optional treatment may be accomplished by using known techniques such as, e.g., film chlorination, exposure to gaseous chlorine, treatment with oxidizing agents such as chromic acid, hot air or steam treatment, flame treatment, corona discharge treatment, and the like.

Application of a metal layer to the film is usually accomplished by conventional vacuum deposition, although other methods known in the art such as electroplating or sputtering may also be used. Aluminum is preferred as the metal Used for this purpose, but other materials such as gold, zinc, copper, silver and the like may also be used for certain purposes.

The following example illustrates the present invention:

EXAMPLE 1

A multi-layer film comprising a core layer and two skin layers was produced. Specifically, a three layer film is extruded with a base (core) layer B of an isotactic polypropylene homopolymer, sold as Fina 3371, a coextruded skin layer A of a propylene-ethylene-butene-1 terpolymer, sold as Chisso 7510, on one surface of the base layer, and a coextruded layer C of syndiotactic polypropylene, sold as Fina EOD 95-02, on the other surface of the base layer.

The coextrudate was quenched at about 37° C., reheated to about 130° C., and stretched in the machine direction about 4.5 times using transport rolls operating at different speeds. After the machine direction orientation, the film was oriented in the transverse direction about 8 times at a temperature of about 160° C.

The resulting film had an overall thickness of about 1 mil, a base layer thickness of about 0.94 mil, an A layer thickness of about 0.02 mil, and a C layer thickness of about 0.04 mil.

This film was then metallized with an aluminum layer using standard commercial-type vacuum deposition equipment.

The film structure thus obtained was tested for water vapor transmission rate (WVTR) in g/100 in$^2$/24 hours, measured as about 0.06, oxygen transmission rate (TO$_2$) in cc/100 in$^2$/24 hours, measured as about 4.9, metal pickoff measured as about 5%, optical density measured as about 2.86, haze measured as about 1.2%, gloss measured as about 88.7%, and coefficient of friction, (I/O) and (O/O), measured as 0.65 and 0.75, respectively.

The results are tabulated below.

| Film Structure | Barrier | | Metal Pickoff | Optical Density | Optics | | COF | |
| | WVTR | TO$_2$ | | | Haze | Gloss | I/O | O/O |
|---|---|---|---|---|---|---|---|---|
| FINA 3371 Core/2 gauge CHISSO 7510 skin layer/4 gauge FINA EOD 95-02 Syndiotactic skin layer | 0.6 | 4.9 | 10% | 2.86 | 1.2 | 88.7 | 0.65 | 0.75 |

What is claimed is:

1. A multi-layer film comprising:
   (a) a base layer comprising a polyolefin; and
   (b) at least one additional layer consisting essentially of a metallocene-catalyzed syndiotactic polypropylene having a melt flow rate of about 1 to about 15 g/10 min., wherein the the layer consisting essentially of metallocene-catalyzed polypropylene is not heat sealable.

2. A multi-layer film according to claim 1, wherein the base layer comprises an isotactic polypropylene homopolymer.

3. A multi-layer film according to claim 1, wherein the metallocene-catalyzed syndiotactic polypropylene has a syndiotacticity of about 75 to about 85% racemic pentads and a melt flow of about 5 to about 8.

4. A multi-layer film according to claim 1 further comprising a heat sealable layer adjacent to a surface of the base layer opposite to said at least one additional syndiotactic polypropylene layer.

5. A multi-layer film according to claim 4, wherein said heat sealable layer comprises an ethylene-propylene copolymer or an ethylene-propylene-butene-1 terpolymer.

6. A multi-layer film according to claim 1 further comprising a metal layer.

7. A multi-layer film according to claim 6, wherein the metal layer is provided by vacuum deposition, electroplating or sputtering.

8. The multi-layer film of claim 1 having a total thickness of about 0.4 mil to about 2.5 mils.

9. The multi-layer film of claim 1, wherein said at least one additional layer consisting essentially of a metallocene-catalyzed syndiotactic polypropylene has a thickness of about 0.02 mil to about 0.4 mil.

10. The multi-layer film of claim 1 wherein the metallocene-catalyzed syndiotactic polypropylene has a melt flow rate of less than about 10 g/10 min.

11. The multi-layer film of claim 1 wherein the metallocene-catalyzed syndiotactic polypropylene has a melt flow rate of less than about 7 g/10 min.

12. A process for producing the multi-layer film of claim 1, comprising:
   (a) providing a base layer comprising a polyolefin;
   (b) providing at least one additional layer consisting essentially of a metallocene-catalyzed syndiotactic polypropylene;
   (c) forming a multi-layer film comprising the base layer of (a) and the additional layer of (b); and
   (d) optionally orienting the multi-layer film in the machine and/or transverse direction(s).

* * * * *